(12) United States Patent
Matsushita

(10) Patent No.: US 9,002,502 B2
(45) Date of Patent: Apr. 7, 2015

(54) METHOD AND PROGRAM FOR CALCULATING CORRECTION VALUE FOR MACHINE TOOL

(75) Inventor: Tetsuya Matsushita, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 461 days.

(21) Appl. No.: 13/419,848

(22) Filed: Mar. 14, 2012

(65) Prior Publication Data

US 2012/0253506 A1  Oct. 4, 2012

(30) Foreign Application Priority Data

Apr. 4, 2011  (JP) .................................. 2011-083080

(51) Int. Cl.
 *G05B 19/18* (2006.01)
 *G05B 19/25* (2006.01)
 *G06F 19/00* (2011.01)
 *G05B 19/404* (2006.01)

(52) U.S. Cl.
 CPC .... *G05B 19/404* (2013.01); *G05B 2219/50285* (2013.01)

(58) Field of Classification Search
 USPC .......... 700/159, 173–175, 186, 193; 318/569, 318/572
 See application file for complete search history.

(56) References Cited

U.S. PATENT DOCUMENTS

| | | | | |
|---|---|---|---|---|
| 3,970,830 A | * | 7/1976 | White et al. | 700/187 |
| 5,408,758 A | * | 4/1995 | Mizutani et al. | 33/702 |
| 6,022,132 A | * | 2/2000 | Schulz | 700/186 |
| 6,519,860 B1 | * | 2/2003 | Bieg et al. | 33/503 |
| 7,869,897 B2 | * | 1/2011 | Otsuki et al. | 700/189 |
| 7,941,240 B2 | * | 5/2011 | Katoh et al. | 700/191 |
| 8,283,884 B2 | * | 10/2012 | Otsuki et al. | 318/572 |
| 2004/0083830 A1 | * | 5/2004 | Nashiki et al. | 73/865.9 |
| 2009/0140684 A1 | * | 6/2009 | Otsuki et al. | 318/572 |
| 2010/0299094 A1 | * | 11/2010 | Hsu | 702/95 |
| 2011/0166693 A1 | * | 7/2011 | Nishibashi | 700/187 |
| 2014/0094970 A1 | * | 4/2014 | Otsuki et al. | 700/275 |

FOREIGN PATENT DOCUMENTS

| | | |
|---|---|---|
| JP | 2004-272887 A1 | 9/2004 |
| JP | 2009-104317 A1 | 5/2009 |

* cited by examiner

*Primary Examiner* — Robert Fennema
*Assistant Examiner* — Jennifer L Norton
(74) *Attorney, Agent, or Firm* — Burr & Brown, PLLC

(57) ABSTRACT

The present invention provides a method and the like that are capable of calculating a correction value for a rotational axis and make it possible to correct an error in position or position and posture of a tool, which results from a geometric error, correct an error in posture of the tool, and also enhance the accuracy in machining by preventing a translational axis from operating in an infinitesimal manner due to a correction command. In a machine tool having two or more translational axes and one or more rotational axes, a correction value for each of the translational axes is calculated using a command position of each of the rotational axes, a coordinate value of a correction reference point as one point designated in advance in a command position space of each of the translational axes, and a geometric parameter representing the geometrical error.

4 Claims, 7 Drawing Sheets

METHOD AND PROGRAM FOR CALCULATING CORRECTION VALUE FOR MACHINE TOOL

CROSS-REFERENCE TO RELATED APPLICATION

This application claims the benefit of Japanese Patent Application Number 2011-083080 filed on Apr. 4, 2011, the entirety of which is incorporated by reference.

BACKGROUND OF THE INVENTION

1. Field of the Invention

The present invention relates to a method and a program for calculating a correction value for correcting a geometric error in a machine tool having translational axes and rotational axes.

2. Description of Related Art

FIG. 1 is a schematic view of a machine tool (a five-axis control machining center or a five-axis machine) having three translational axes and two rotational axes, as an example of the above-described machine tool. A spindle head 2 can make motions with two degrees of freedom of translation with respect to a bed 1, along X- and Z-axes as translational axes, which are perpendicular to each other. A table 3 can make motions with one degree of freedom of rotation with respect to a cradle 4, around a C-axis as a rotational axis. The cradle 4 can make motions with one degree of freedom of rotation with respect to a trunnion 5, around an A-axis as a rotational axis, and the A-axis and the C-axis are perpendicular to each other. The trunnion 5 can make motions with one degree of freedom of translation with respect to the bed 1, along a Y-axis as a translational axis, which is perpendicular to the X- and Z-axes. The respective axes are driven by a servomotor (not shown) that is controlled by a numerical control device, an object to be machined (a work) is fixed on the table 3, and the spindle head 2 is fitted with a tool and rotated to machine the object to be machined while controlling the position thereof relative to the tool.

Examples of factors having an influence on the accuracy in the motion of the five-axis machine include geometrical errors (geometric errors) among the respective axes. For instance, an error in the center position of each of the rotational axes (a deviation from a prescribed position), an error in the gradient of each of the rotational axes (a degree of perpendicularity or parallelity between the axes), and the like. The presence of a geometric error leads to a deterioration in the accuracy in the motion of the machine tool, and to a deterioration in the accuracy in the machining of the object to be machined. Therefore, the geometric error needs to be reduced through adjustment, but it is difficult to completely eliminate the geometric error. The machining can be carried out with high accuracy by performing a control of correcting the geometric error.

A method as described in Japanese Patent Application Publication No. 2004-272887 (JP 2004-272887 A) has been proposed as means for correcting a geometric error. In the method described in that, an error in the position of a distal end of a tool resulting from a geometric error in a machine tool can be corrected by converting the position of the distal end of the tool into positions on respective translational axes in consideration of the geometric error, and designating those positions as command positions. On the other hand, according to Japanese Patent Application Publication No. 2009-104317 (JP 2009-104317 A), an error in the position of a distal end of a tool resulting from a geometric error can be corrected by performing a control in which a value representing a difference between a position of the distal end of the tool with respect to an object to be machined in the case where there is a geometric error and a position of the distal end of the tool with respect to the object to be machined in the case where there is no geometric error is adopted as a correction value for a translational axis.

In these methods, in the case where an error in the gradient of a rotational axis is corrected, a command to correct a translational axis is issued as the translational axis operates. Therefore, even when only one of the translational axes is operated, the other translational axes operate in an infinitesimal manner. For example, in the case where there is an error in the degree of parallelity between the X-axis and the A-axis, even when only the X-axis is operated, the Y-axis or the Z-axis operates in an infinitesimal manner.

Such an operation may adversely affect the accuracy in machining such as flattening, drilling, or the like. For example, in the five-axis machine of FIG. 1, in the case where the A-axis is inclined with respect to the X-axis by an angle β due to a geometric error in the rotation around the Y-axis as shown in FIG. 2, it is assumed that flattening is carried out by a square end mill (a tool) 6, with a feed direction coincident with a direction from the obverse to the reverse side of the sheet of FIG. 2, and with a pick direction coincident with a direction indicated by a thick arrow P. Then, the distal end of the tool is positioned in the pick direction on a point group on a line inclined with respect to the X-axis by the angle β, due to a correction. That is, respective positioning positions Q in the pick direction are arranged on the line inclined by the angle β, so that a step is produced on a surface to be machined. Further, in the case where a rectilinear axis is guided through sliding, when this rectilinear axis is operated in an infinitesimal manner as described above, the axis moves sometimes, and does not move at other times. That is, so-called "stop feed" occurs to bring about a deterioration in the properties of a machined surface, such as the creation of irregularities along the machined surface or the like. In addition, in the case where drilling is carried out by a drill instead of flattening by the square end mill 6, the Z-axis is fed in a direction that forms the angle β with respect to the Z-axis, which is the axial direction of the drill. Therefore, an abnormality in the diameter of a bore occurs, and also a reduction in the life span of the drill are incurred.

SUMMARY OF THE INVENTION

It is thus an object of the present invention to provide a method and a program that are capable of calculating a correction value for a rotational axis and make it possible to correct an error in position or position and posture of a tool resulting from a geometric error, correct an error in posture of the tool, and also enhance the accuracy in machining by preventing a translational axis from operating in an infinitesimal manner due to a correction command, in a machine tool such as a five-axis machine or the like.

In order to achieve the above-stated object, a first aspect of the present invention provides a method of calculating a correction value for a machine tool having two or more translational axes and one or more rotational axes to correct an error in position or position and posture of a tool with respect to an object to be machined, which results from a geometrical error, in the machine tool. This method includes calculating a correction value for each of the translational axes using a command position of each of the rotational axes, a coordinate value of a correction reference point as one point designated in advance in a command position space of each of the translational axes, and a geometric parameter representing the geometrical error.

In the foregoing aspect of the present invention, the correction value for each of the translational axes may be calculated also using a command position of each of the translational axes to which the coordinate value of the correction reference point is assigned.

In the foregoing aspect of the present invention, the correction reference point may move in accordance with the command position of each of the rotational axes.

In order to achieve the above-stated object, a second aspect of the present invention provides a program for calculating a correction value for a machine tool, which is designed to cause a computer to carry out the method of calculating the correction value for the machine tool.

According to the present invention, while the correction value for each of the translational axes is changed in the case where each of the rotational axes operates, the correction value for each of the translational axes is not changed in the case where it operates. Therefore, even in the case where each of the rotational axes is indexed to carry out flattening, drilling, or the like, a decrease in the accuracy of a machined surface, a deterioration in appearance quality, or a reduction in the life span of the tool is not caused. As a result, machining is carried out with high accuracy.

DETAILED DESCRIPTION OF THE INVENTION

First Embodiment

Figure 1:
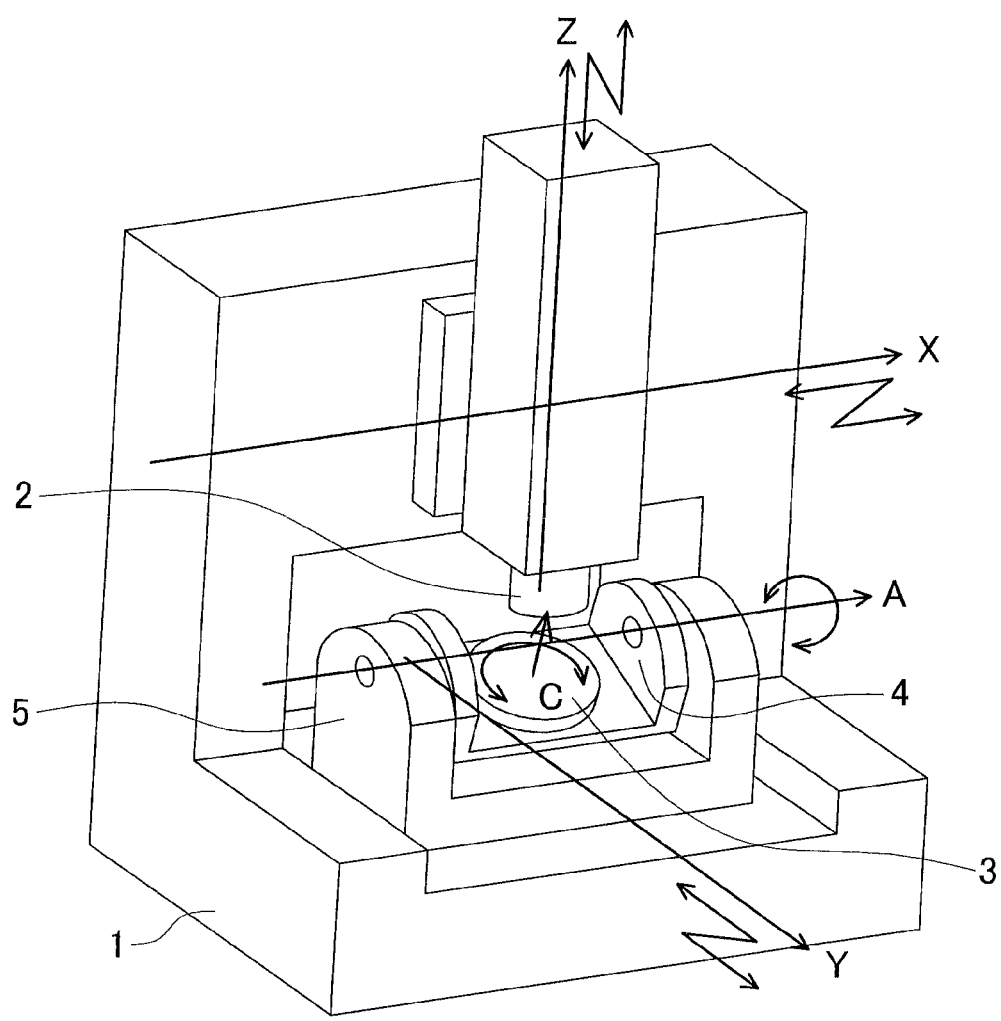
FIG. 1 is a schematic view of a five-axis control machining center (a five-axis machine).

A correction made in the five-axis machine shown in FIG. 1 will be described hereinafter as an example of an embodiment according to the present invention, on the basis of the drawings as needed. This correction is made by a computer that executes a correction program. The computer may be a numerical control device for the five-axis machine, an independent control device connected to the numerical control device, or a combination of these control devices. It should be noted that this embodiment of the present invention is not limited to an example shown below. For example, it may also be applied to a machine tool having four or less axes or six or more axes, that the rotational axes may provide the spindle head 2 with two degrees of freedom of rotation instead of providing the table 3 with two degrees of freedom of rotation, or that the rotational axes may provide each of the spindle head 2 and the table 3 with one or more degrees of freedom of rotation. Further, instead of the machining center (FIG. 1), a lathe, a multi-tasking machine, a grinding machine, or the like can be adopted as a machine tool.

Figure 3:
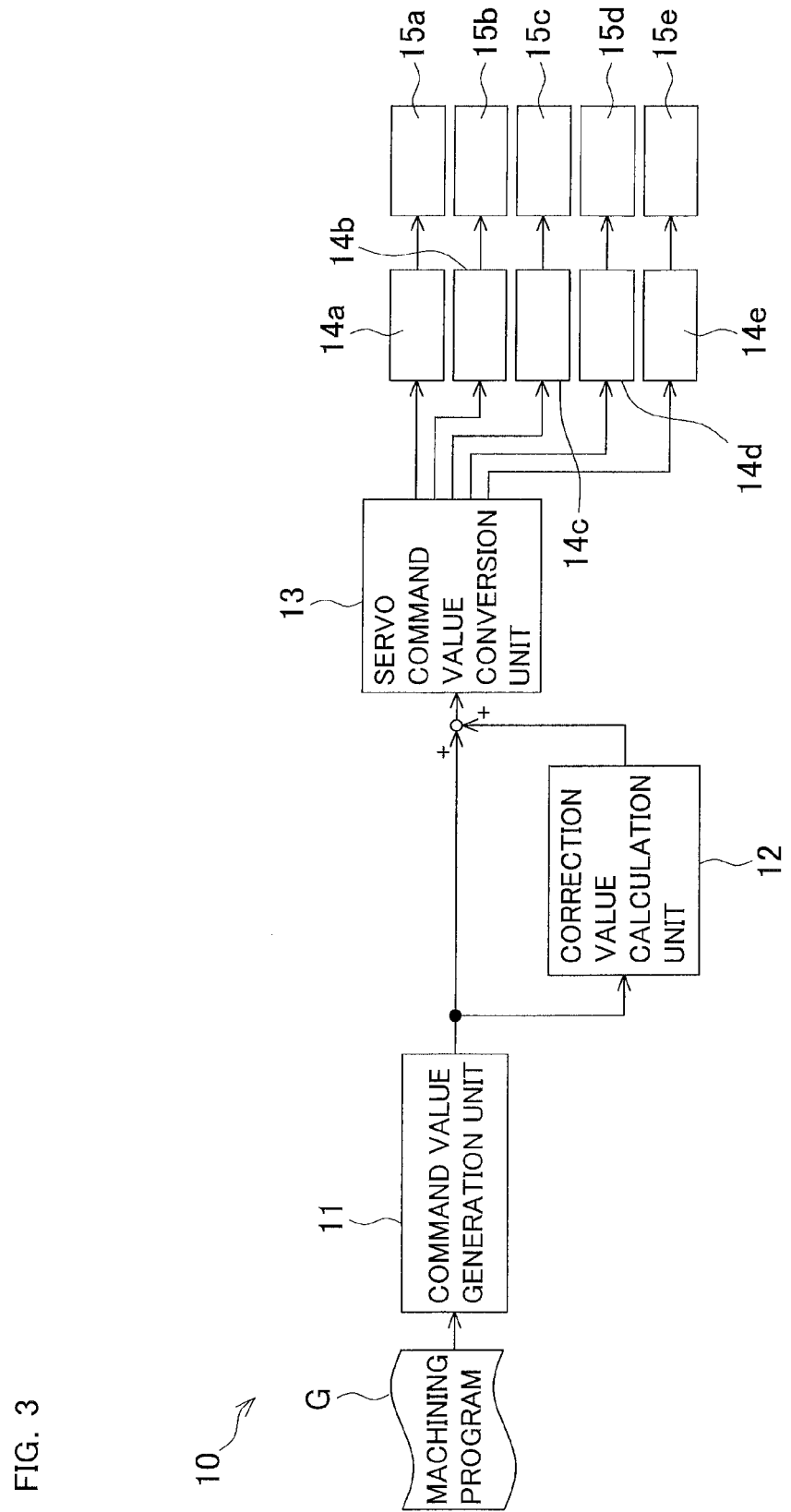
FIG. 3 is a block diagram of a control device that carries out a control method of the present invention.

FIG. 3 is an example of a numerical control device 10 for carrying out a control method of the first embodiment according to the present invention. When a machining program G is input to a command value generation unit 11, the command value generation unit 11 generates command values for respective drive axes. A correction value calculation unit 12 calculates correction values for the respective axes on the basis of the command values generated by the command value generation unit 11. After receiving sums of the command values and the correction values, a servo command value conversion unit 13 calculates servo command values for the respective axes, and transmits them to servo amplifiers 14a to 14e for the respective axes. The servo amplifiers 14a to 14e for the axes drive servomotors 15a to 15e respectively, thus controlling the position and posture of the spindle head 2 relative to the table 3.

Next, geometric errors will be described. The geometric errors are defined as a total of six components ($\delta x$, $\delta y$, $\delta z$, $\alpha$, $\beta$, $\gamma$) in three relative translational error directions among the respective axes and three relative rotational error directions among the respective axes. The axes are associated with one another in the sequence of the C-axis, the A-axis, the Y-axis, the X-axis, and the Z-axis in a direction from a work 7 fixed on the table 3 of the five-axis machine to a tool fixed to the spindle head 2. If a space between the Z-axis and the tool and a space between the work 7 and the C-axis are taken into account as well, there are a total of 36 geometric errors. However, since some of the 36 geometric errors establish a redundant relationship, these geometric errors are excluded to obtain final geometric errors.

Then, if the axis name and the rank order of each of the geometric errors from the tool side are expressed in the form of suffix, there are a total of 13 final geometric errors $\delta x_5$, $\delta y_5$, $\alpha_5$, $\beta_5$, $\delta_4$, $\delta z_4$, $\beta_4$, $\gamma_4$, $\gamma_3$, $\alpha_2$, $\beta_2$, $\alpha_1$, and $\beta_1$. These final geometric errors are a C-axis center position X-direction error, a C-A inter-axis offset error, an A-axis angular offset error, a C-A inter-axis degree of perpendicularity, an A-axis center position Y-direction error, an A-axis center position Z-direction error, an A-X inter-axis degree of perpendicularity, an A-Y inter-axis degree of perpendicularity, an X-Y inter-axis degree of perpendicularity, a Y-Z inter-axis degree of perpendicularity, a Z-X inter-axis degree of perpendicularity, a spindle-Y inter-axis degree of perpendicularity, and a spindle-X inter-axis degree of perpendicularity in this order, respectively. It should be noted that the numerical control device 10 includes storage units (not shown) for storing these geometric errors.

Figure 4:
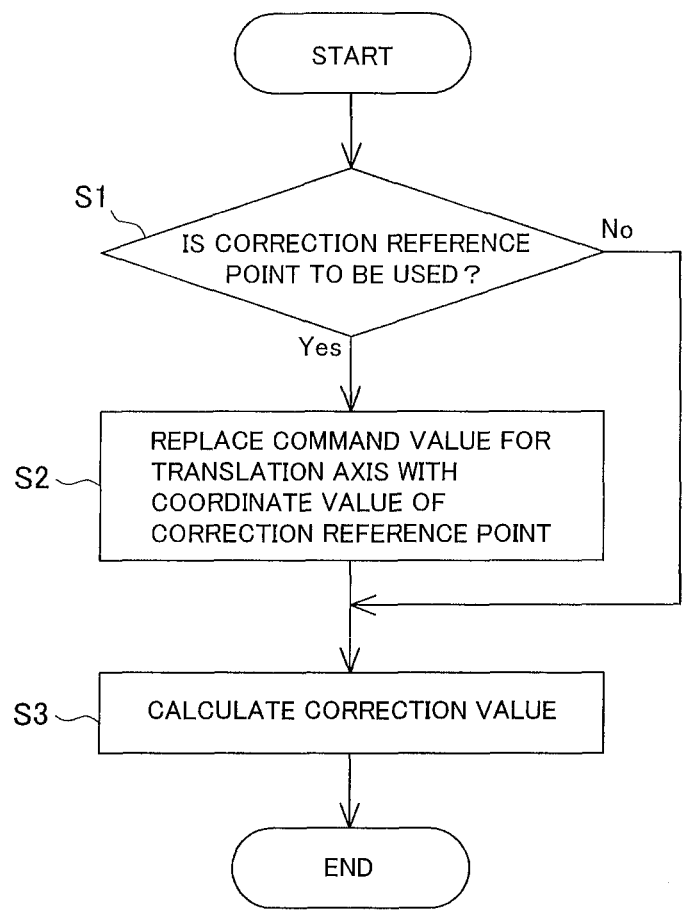
FIG. 4 is a flowchart of calculation of a correction value in the first embodiment of the present invention.

Subsequently, a method of calculating a correction value according to the first embodiment of the present invention, which is carried out by the numerical control device 10, will be described. FIG. 4 is a flowchart of this calculation of the correction value.

It is determined in step S1 whether or not a coordinate value of a correction reference point is to be used instead of a command value for each of the translational axes to calculate the correction value. The correction reference point is an arbitrary point belonging to the same coordinate system as the command value (a command coordinate system). And its coordinate value is set to a value within a range defined by command values for the X-, Y-, and Z-axes. A value set and stored in advance, a value described in the machining program G for generating the command values etc., or the like is used as the coordinate value.

In the case where the correction reference point is used, in step S2, a command value $P_O=(x, y, z)$ for each of the translational axes is replaced with a coordinate value $P_d=(x_d, y_d, z_d)$ of the correction reference point. On the other hand, in the case where the coordinate value of the correction reference point is not used, this replacement is not carried out. Then in step S3, a correction value is calculated using command values for the respective axes.

The calculation in step S3 will be described. A tool distal end point vector $P_T$ on a spindle coordinate system on the spindle head 2 can be converted into a vector on a work coordinate system on the table 3, by performing homogeneous coordinate conversion using [Expression 1] shown below. In that expression, t denotes a length of a tool to be used, and x, y, z, a, and c denote command positions of the X-, Y-, Z-, A-, and C-axes respectively. That is, a tool distal end point vector $P_I$ in the work coordinate system in the case where there is no geometric error is obtained.

$$P_1 = M_5 \cdot M_4 \cdot M_3 \cdot M_2 \cdot M_1 \cdot P_T, \text{ where} \quad [\text{Expression 1}]$$

$$M_5 = \begin{bmatrix} \cos c & -\sin c & 0 & 0 \\ \sin c & \cos c & 0 & 0 \\ 0 & 0 & 1 & 0 \\ 0 & 0 & 0 & 1 \end{bmatrix},$$

$$M_4 = \begin{bmatrix} 1 & 0 & 0 & 0 \\ 0 & \cos a & -\sin a & 0 \\ 0 & \sin a & \cos a & 0 \\ 0 & 0 & 0 & 1 \end{bmatrix} M_3 = \begin{bmatrix} 1 & 0 & 0 & 0 \\ 0 & 1 & 0 & y \\ 0 & 0 & 1 & 0 \\ 0 & 0 & 0 & 1 \end{bmatrix},$$

$$M_2 = \begin{bmatrix} 1 & 0 & 0 & x \\ 0 & 1 & 0 & 0 \\ 0 & 0 & 1 & 0 \\ 0 & 0 & 0 & 1 \end{bmatrix},$$

$$M_1 = \begin{bmatrix} 1 & 0 & 0 & 0 \\ 0 & 1 & 0 & 0 \\ 0 & 0 & 1 & z \\ 0 & 0 & 0 & 1 \end{bmatrix}, P_T = \begin{bmatrix} 0 \\ 0 \\ -t \\ 1 \end{bmatrix}$$

On the other hand, as indicated by [Expression 2] shown below, the respective geometric errors are arranged as conversion matrices among conversion matrices for the respective axes in the above [Expression 1], so that a tool distal end point vector $P_R$ on the work coordinate system in the case where there are geometric errors is obtained. It should be noted that [Expression 2] is an approximate expression in which the product of the geometric errors is regarded as 0 on the assumption that these geometric errors are infinitesimal.

$$P_R = \varepsilon_6 \cdot M_5 \cdot \varepsilon_5 \cdot M_4 \cdot \varepsilon_4 \cdot M_3 \cdot \varepsilon_3 \cdot M_2 \cdot \varepsilon_2 \cdot M_1 \cdot \varepsilon_1 \cdot P_T, \quad [\text{Expression 2}]$$

where $$\varepsilon_1 = \begin{bmatrix} 1 & -\gamma_j & \beta_j & \delta x_j \\ \gamma_j & 1 & -\alpha_j & \delta y_j \\ -\beta_j & \alpha_j & 1 & \delta z_j \\ 0 & 0 & 0 & 1 \end{bmatrix} (j = 1, 2, \ldots, 6)$$

Accordingly, an error $\Delta P_W=(\delta x, \delta y, \delta z)$ in the position of the distal end point of the tool on the work coordinate system is expressed by [Expression 3] shown below.

$$\Delta P_W = P_R - P_1 \quad [\text{Expression 3}]$$

In addition, an error $\Delta P_O$ in the command values can be obtained by subjecting the error $\Delta P_W$ in the position of the distal end point of the tool on the work coordinate system to coordinate conversion as indicated by [Expression 4] shown below.

$$\Delta P_O = M_4^{-1} \cdot M_5^{-1} \cdot \Delta P_W \quad [\text{Expression 4}]$$

In consequence, correction values $\Delta P=(\Delta x, \Delta y, \Delta z)$ for the X-, Y-, and Z-axes are obtained from the command values for the respective axes, and [Expression 5] shown below, in which the geometric errors in the above expression are used as parameters (geometric parameters) that are measured and identified in advance.

$$\Delta P = -\Delta P_O = M_3 \cdot M_2 \cdot M_1 \cdot P_T - M_4^{-1} \cdot M_5^{-1} \cdot \varepsilon_6 \cdot M_5 \cdot \varepsilon_5 \cdot M_4 \cdot \varepsilon_4 \cdot M_3 \cdot \varepsilon_3 \cdot M_2 \cdot \varepsilon_2 \cdot M_1 \cdot \varepsilon_1 \cdot P_T \quad [\text{Expression 5}]$$

The error in the position of the distal end point of the tool, which results from the geometric errors, can be corrected by issuing a command to add the thus-obtained correction value $\Delta P$ for each of the translational axes to command values for corresponding ones of the translational axes respectively.

It should be noted that although the command value $P_O$ for each of the translational axes is replaced with the coordinate value $P_d$ of the correction reference point in step S2 in the case where the correction reference point is used in the foregoing description, the coordinate value $P_d$ of the correction reference point may be used instead of the command value $P_O$ for each of the translational axes in the calculation of the correction value in step S3, without carrying out the above replacement. That is, $M_{1d}$, $M_{2d}$, and $M_{3d}$ in [Expression 6] shown below are used instead of the matrices $M_1$, $M_2$, and $M_3$ in [Expression 1] respectively.

$$M_{3d} = \begin{bmatrix} 1 & 0 & 0 & 0 \\ 0 & 1 & 0 & y_d \\ 0 & 0 & 1 & 0 \\ 0 & 0 & 0 & 1 \end{bmatrix}, M_{2d} = \begin{bmatrix} 1 & 0 & 0 & x_d \\ 0 & 1 & 0 & 0 \\ 0 & 0 & 1 & 0 \\ 0 & 0 & 0 & 1 \end{bmatrix}, \quad [\text{Expression 6}]$$

$$M_{1d} = \begin{bmatrix} 1 & 0 & 0 & 0 \\ 0 & 1 & 0 & 0 \\ 0 & 0 & 1 & z_d \\ 0 & 0 & 0 & 1 \end{bmatrix}$$

Second Embodiment

Subsequently, the second embodiment of the present invention will be described, focusing on what is different from the first embodiment of the present invention. The second embodiment of the present invention is identical in physical configuration to the first embodiment of the present invention, but is different therefrom in the method of calculating a correction value.

Figure 5:
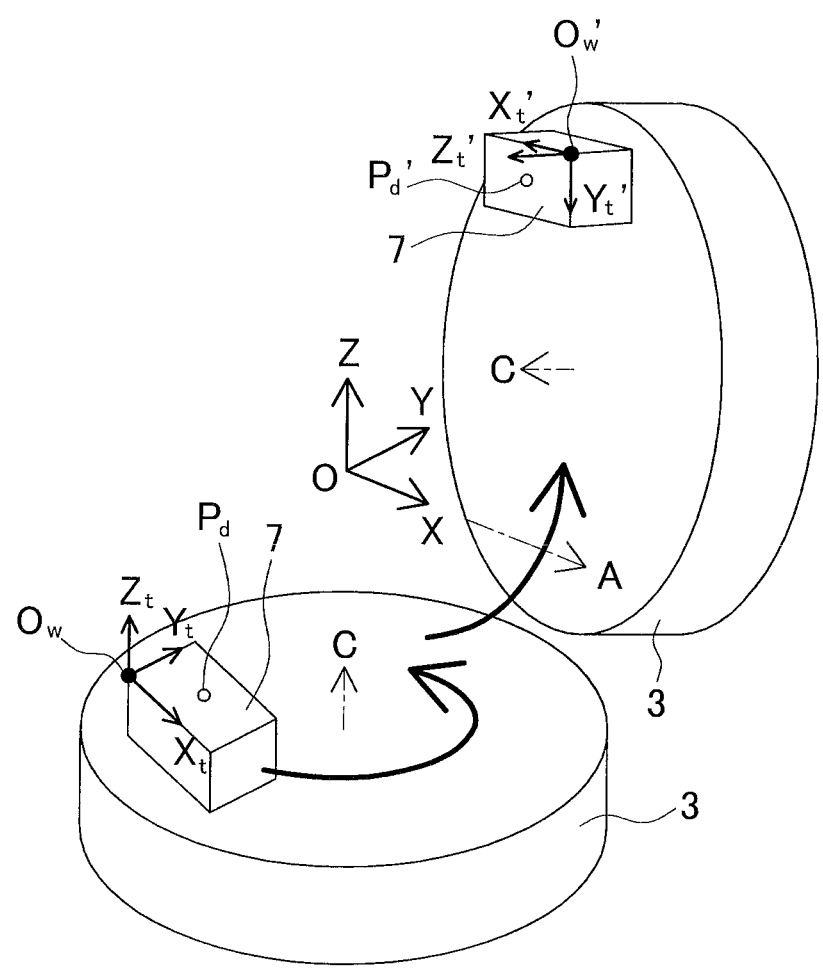
FIG. 5 is a schematic view of the movement of a correction reference point in synchronization with the operation of a rotational axis in the second embodiment of the present invention.

That is, in calculation according to the second embodiment of the present invention, a correction reference point is defined not as a point on a command value coordinate system, but as a point on an arbitrary table reference coordinate system. The table reference coordinate system is a coordinate system fixed on the table 3. This coordinate system moves as the table 3 is rotated or inclined on the command value coordinate system. FIG. 5 is an example of the table reference coordinate system and the correction reference point. An origin $O_w$ of the table reference coordinate system, with which the apex of the object to be machined (the work 7)

coincides, and a correction reference point $P_d$ move to points $O_w'$ and $P_d'$, respectively, due to rotation around the A- and C-axes.

Figure 6:
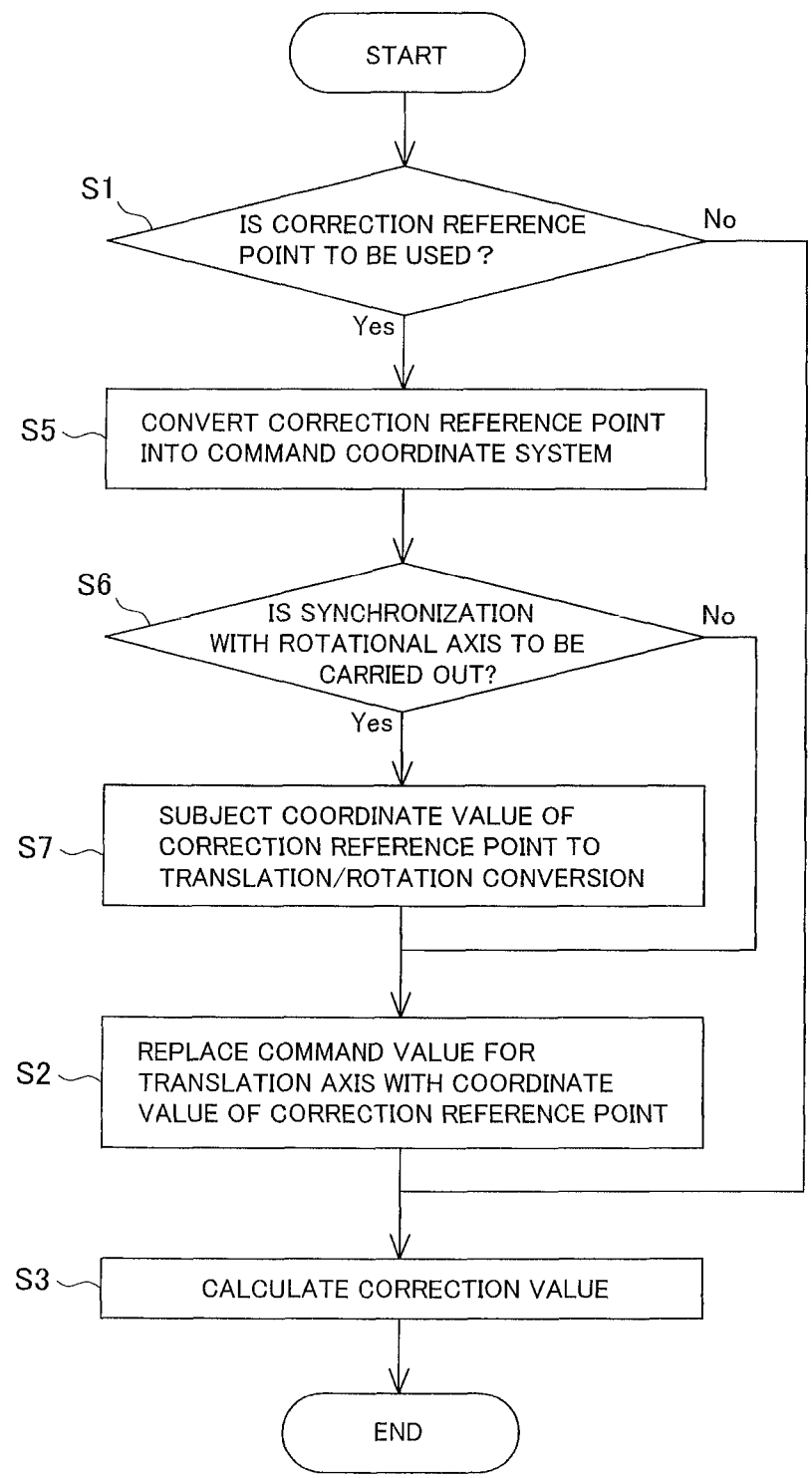
FIG. 6 is a flowchart of calculation of a correction value in the second embodiment of the present invention.

FIG. 6 is a flowchart of the method of calculating the correction value according to the second embodiment of the present invention. The steps identical in content to those of the first embodiment of the present invention (FIG. 3) are denoted by the same reference symbols as in the first embodiment of the present invention, and the re-description thereof will be omitted as needed.

When it is determined in step S1 that the correction reference point is to be used, a coordinate value ${}^W P_d = (x_{wd}, y_{wd}, z_{Wd})$ of the correction reference point on the table reference coordinate system is converted into a value $P_d = (x_d, y_d, z_d)$ in the command value coordinate system according to [Expression 7] shown below. It should be noted herein that the origin $O_w$ of the table reference coordinate system is expressed as $O_w = (x_w, y_w, z_w)$.

$$P_d = {}^W P_d + O_W \quad \text{[Expression 7]}$$

It is then determined in step S6 whether or not synchronization with each of the rotational axes is to be carried out. When synchronization with each of the rotational axes is to be carried out, the coordinate value of the correction reference point on the command value coordinate system is subjected to translation/rotation conversion in step S7. In the case where rotation centers of the A- and C-axes intersect with each other at one point due to a design and the intersection point is the same as the origin of the command value coordinate system as is the case with this embodiment of the present invention, a correction reference point $P_d' = (x_d', y_d', z_d')$ on the command value coordinate system, which has been subjected to translation/rotation conversion according to [Expression 8] shown below, is obtained. On the other hand, when synchronization with each of the rotational axes is not to be carried out, translation/rotation conversion is not carried out.

$$P_d' = M_4^{-1} M_5^{-1} P_d \quad \text{[Expression 8]}$$

Thereafter, the command value for each of the translation axes is replaced with the coordinate value of the correction reference point in step S2, and a correction value is calculated in step S3.

EFFECTS OF RESPECTIVE EMBODIMENTS

The effects of the foregoing respective embodiments of the present invention will be described using expressions. It should be noted that both the embodiments of the present invention offer substantially the same calculation result or correction effect, although the coordinate system to focus attention on in the course of calculation differs therebetween.

It is assumed that the 13 geometric errors $\delta_{x5}$, $\delta_{y5}$, $\alpha_5$, $\beta_5$, $\delta_{y4}$, $\delta_{z4}$, $\beta_4$, $\gamma_4$, $\gamma_3$, $\alpha_2$, $\beta_2$, $\alpha_1$, and $\beta_1$ exist in the machine. It should be noted that the following expressions are approximated, for the sake of simplification, such that the product of the geometric errors is regarded as 0 on the assumption that the geometric errors are infinitesimal.

Correction values ($\Delta x$, $\Delta y$, $\Delta z$) for each of the translational axes in the case of a tool length t=0 are expressed by [Expression 9] shown below. Accordingly, the correction value for the X-axis changes depending on the command values for the Y-, Z-, and A-axes, the correction value for the Y-axis changes depending on the command values for the X-, Z-, and A-axes, and the correction value for the Z-axis changes depending on the command values for the X-, Y-, and A-axes.

$$\Delta x = -(\beta_5 \cdot \sin a - \gamma_4) \cdot y - (\beta_5 \cdot \cos a + \beta_4 + \beta_2) \cdot z - \delta x_5$$

$$\Delta y = (\beta_5 \cdot \sin a - \gamma_4 - \gamma_3) \cdot x + (\alpha_5 + \alpha_2) \cdot z - \delta y_5 \cdot \cos a - \delta y_4$$

$$\Delta z = (\beta_5 \cdot \cos a + \beta_4) \cdot x - \alpha_5 \cdot y + \delta y_5 \cdot \sin a - \delta z_4 \quad \text{[Expression 9]}$$

For example, in the case where only the X-axis is operated until command values (x, y, z, a, c) for the X-, Y-, Z-, A-, and C-axes change from (0, 0, 0, 0, 0) to $(x_1, 0, 0, 0, 0)$, amounts of change ($e_x$, $e_y$, $e_z$) in conventional correction values are expressed by [Expression 10] shown below. That is, the Y- and Z-axes operate in an infinitesimal manner.

$$e_x = 0$$

$$e_y = -(\gamma_4 + \gamma_3) \cdot x_1$$

$$e_z = (\beta_5 + \beta_4) \cdot x_1 \quad \text{[Expression 10]}$$

In contrast, correction values in the case where the correction reference point $(x_d', y_d', z_d')$ is used as is the case with the foregoing embodiment of the present invention are expressed by [Expression 11] shown below. Accordingly, each of the correction values changes depending not on the command value for a corresponding one of the translational axes but on the command value for a corresponding one of the rotational axes.

$$\Delta x = -(\beta_5 \cdot \sin a - \gamma_4) \cdot y_d' - (\beta_5 \cdot \cos a + \beta_4 + \beta_2) \cdot z_d' - \delta x_5$$

$$\Delta y = (\beta_5 \cdot \sin a - \gamma_4 - \gamma_3) \cdot x_d' + (\alpha_5 + \alpha_2) \cdot z_d' - \delta y_5 \cdot \cos a - \delta y_4$$

$$\Delta z = (\beta_5 \cdot \cos a + \beta_4) \cdot x_d' - \alpha_5 \cdot y_d' + \delta y_5 \cdot \sin a - \delta z_4 \quad \text{[Expression 11]}$$

In the case where only the aforementioned X-axis is operated using the correction reference point as in the foregoing embodiment of the present invention, amounts of change ($e_x'$, $e_y'$, $e_z'$) in the correction values are expressed by [Expression 12] shown below. That is, each of the translational axes does not operate in an infinitesimal manner.

$$e_x' = 0$$

$$e_y' = 0$$

$$e_z' = 0 \quad \text{[Expression 12]}$$

Further, in the foregoing embodiment, in the case where only the A-axis is operated by −90° until the command values (x, y, z, a, c) change from (0, 0, 0, 0, 0) to (0, 0, 0, −90°, 0), amounts of change in the correction values based on the use of the correction reference point are expressed by [Expression 13] shown below. That is, the correction values change due to the operation of the A-axis.

$$e_x' = 0$$

$$e_y' = \delta y_5$$

$$e_z' = -\delta y_5 \quad \text{[Expression 13]}$$

Figure 2:
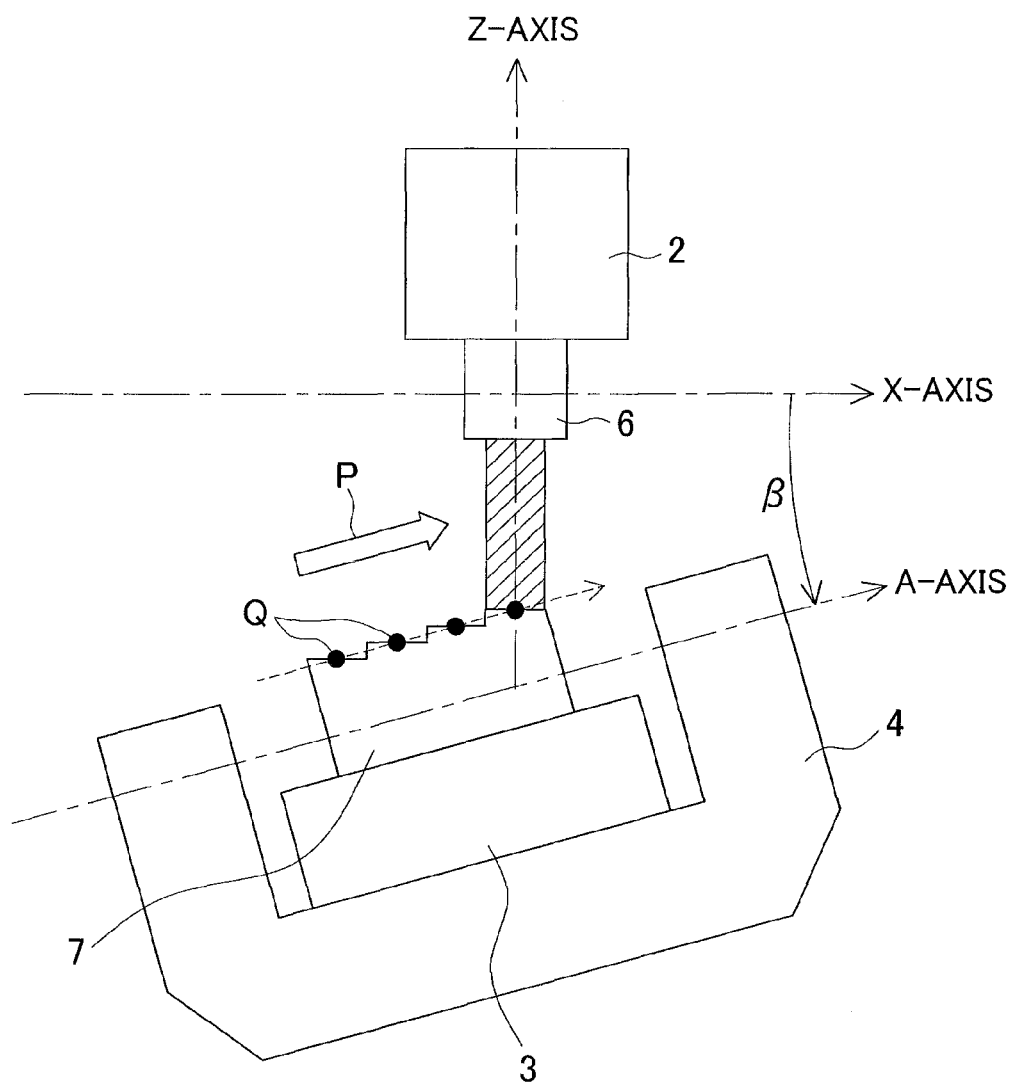
FIG. 2 is a schematic view of a table and the like during machining by a five-axis machine according to a conventional example, as viewed in a direction that is perpendicular to a pick direction.
Figure 7:
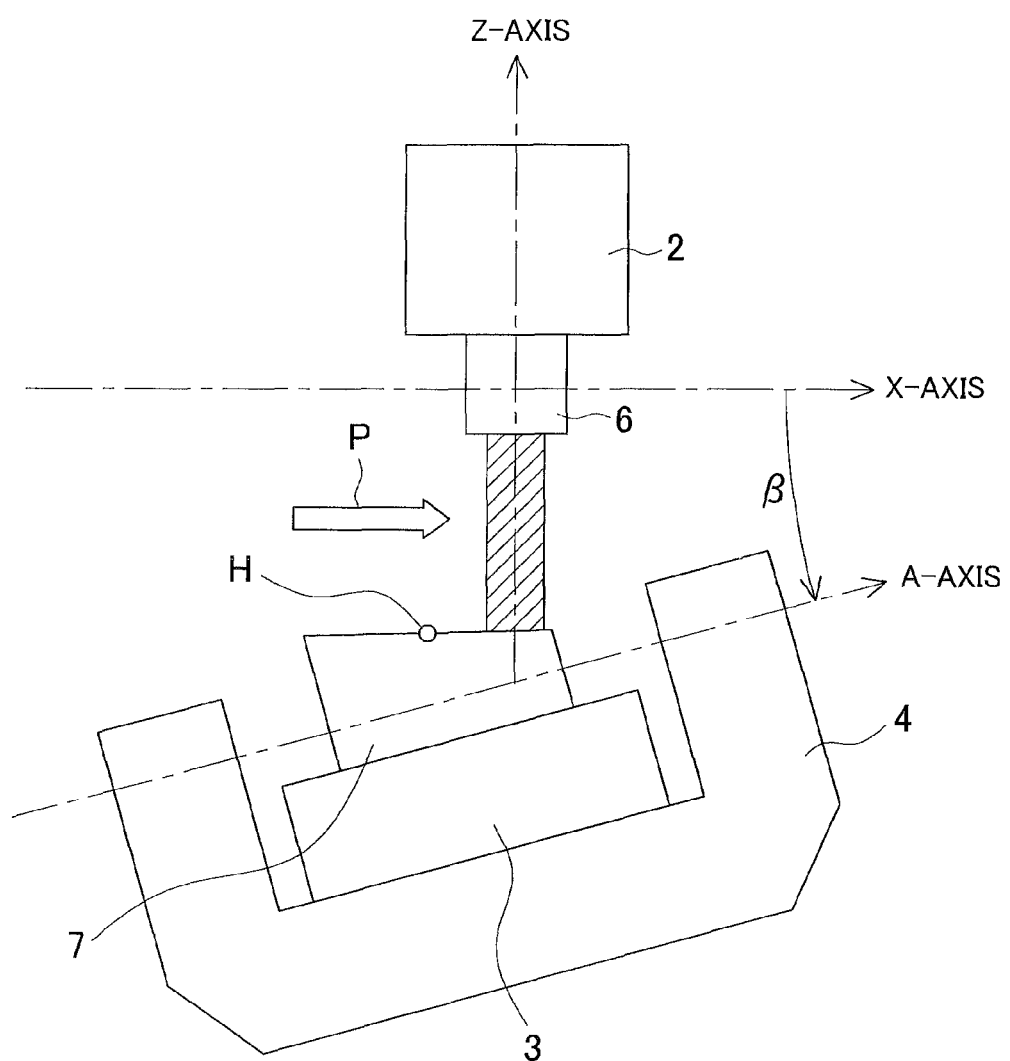
FIG. 7 is a schematic view equivalent to FIG. 2, which is related to the present invention.

As is apparent from the foregoing, in the case where the same flattening as in the aforementioned conventional case shown in FIG. 2 is carried out, the foregoing embodiment of the present invention in which the correction reference point is used makes it possible to carry out the flattening without producing a step in the pick direction (the direction indicated by the thick arrow P) as shown in FIG. 7. Furthermore, even in the case where each of the rotational axes is indexed at another angle by setting the correction reference point (a point H in FIG. 7) in the vicinity of a machining point, machining can be carried out with geometric errors corrected with sufficient accuracy, as long as the distance to the correction reference point is short.

It should be noted that although the error in rotation (the error in posture) of the tool as well as the error in position of the tool is calculated in each of the foregoing embodiments of the present invention, it is also appropriate to omit the parameter of the latter error in posture or the like, refrain from calculating a correction value for the error in posture, and calculate a correction value for each of the translational axes using the correction reference point, only as to the error in position. Further, the geometric parameters, the number of rows in each of the matrices, the number of columns in each of the matrices, the elements in each of the matrices, the matrices to be calculated in each of the expressions, and the like can be increased/reduced or changed.

What is claimed is:

1. A method of calculating a correction value for a machine tool having two or more translational axes and one or more rotational axes to correct an error in one of a position and a position and posture of a tool with respect to an object to be machined, which results from a geometric error in the machine tool, comprising a step of:

calculating a correction value for each of the translational axes using a command position of each of the rotational axes, a coordinate value of a correction reference point as one point designated in advance in a command position space of each of the translational axes, a command position of each of the translational axes to which the coordinate value of the correction reference point is assigned, and a geometric parameter representing the geometric error as a geometric relative error between the respective axes, wherein an error in a position of the tool in a work coordinate system of the object to be machined with the geometric parameter is calculated using:

a position of the tool including the geometric parameter obtained by a homogeneous coordinate conversion from the tool coordinate system to the work coordinate system of the object to be machined, and an optimal position of the tool where the geometric parameter is not included obtained by a homogenous coordinate conversion from the tool coordinate system to the work coordinate system of the object to be machined, and wherein the calculated error in the position of the tool is converted to a command value coordinate system for the respective axes by a homogeneous coordinate conversion from the work coordinate system to the command value coordinate system to provide the calculated correction value for each of the translational axes.

2. The method of calculating the correction value for the machine tool according to claim 1, wherein the correction reference point moves in accordance with the command position of each of the rotational axes.

3. A control device for calculating a correction value for a machine tool according to the method of claim 1.

4. A control device for calculating a correction value for a machine tool according to the method of claim 2.

* * * * *